United States Patent
Ludtke et al.

(10) Patent No.: US 6,421,069 B1
(45) Date of Patent: *Jul. 16, 2002

(54) METHOD AND APPARATUS FOR INCLUDING SELF-DESCRIBING INFORMATION WITHIN DEVICES

(75) Inventors: Harold Aaron Ludtke, San Jose; Bruce Fairman, Woodside; Scott Smyers, San Jose; Hisato Shima, Saratoga, all of CA (US); Andrew M. Proehl, New York, NY (US)

(73) Assignees: Sony Corporation, Tokyo (JP); Sony Electronics Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,703
(22) Filed: Jun. 4, 1998

Related U.S. Application Data

(60) Provisional application No. 60/054,327, filed on Jul. 31, 1997.

(51) Int. Cl.[7] .............................................. G06F 13/10
(52) U.S. Cl. ...................................... 345/762; 709/321
(58) Field of Search ................................ 345/326, 327, 345/333, 335, 336, 700, 716, 762, 744, 764; 348/3, 6, 8, 10; 209/321, 332, 320; 710/63, 64, 65

(56) References Cited

U.S. PATENT DOCUMENTS

| | | | |
|---|---|---|---|
| 4,562,535 A | 12/1985 | Vincent et al. | .............. 364/200 |
| 4,815,034 A | * 3/1989 | Mackey | ....................... 709/300 |

(List continued on next page.)

FOREIGN PATENT DOCUMENTS

| | | | | |
|---|---|---|---|---|
| DE | 3812607 A1 | 10/1988 | ............. | G06F/1/00 |
| EP | 0 745 929 A1 | 12/1996 | ............. | G06F/3/12 |
| GB | 2203869 A | 10/1988 | ........... | G06F/11/30 |

OTHER PUBLICATIONS

IEEE, "1394–1995 Standard for a High Performance Serial Bus," 1995, USA.

(List continued on next page.)

*Primary Examiner*—Cao H. Nguyen
(74) *Attorney, Agent, or Firm*—Haverstock & Owens LLP

(57) ABSTRACT

Self-describing information is included within a device and contains information relating to a graphical representation of the device, the controls available on the device and the interface required to access those controls. The self-describing information is preferably embedded within a ROM within the device and is read by other devices coupled to the device for presenting a graphical user interface through which the device can be remotely controlled by a user. The self-describing information can also include an address from which additional information about the device and upgrades are automatically obtained. This address is either an internet address or points to a location within a network of devices. The address can also be modifiable. Alternatively, the self-describing information also includes driving software for enhancing the graphical user interface and controlling the operation of the device through another system. This driving software is written either in the native language of the device on which it is uploaded and executed or in a platform neutral language such as Java™. The graphical user interface is presented on a television, computer or other appropriate system for controlling multiple devices through the system. The controlling system obtains the self-describing information from each device within the configuration. The graphical user interface includes a graphical representation of the devices and specific control features available to the user presented in a graphical orientation. Alternatively, a three-dimensional representation of the device is presented with controls represented on the device. If no controlling system is available, a graphical user interface is controlled by an application within the device and presented on an available display.

64 Claims, 10 Drawing Sheets

U.S. PATENT DOCUMENTS

| | | | |
|---|---|---|---|
| 5,077,732 A | | 12/1991 | Fischer et al. ............. 370/85.4 |
| 5,261,044 A | | 11/1993 | Dev et al. ................... 395/159 |
| 5,394,556 A | | 2/1995 | Oprescu ..................... 395/800 |
| 5,499,018 A | | 3/1996 | Welmer ................. 340/825.07 |
| 5,537,104 A | | 7/1996 | Van Dort et al. ....... 340/825.52 |
| 5,574,965 A | | 11/1996 | Welmer ...................... 455/3.2 |
| 5,589,892 A | * | 12/1996 | Knee et al. ..................... 348/8 |
| 5,606,664 A | | 2/1997 | Brown et al. ............ 395/200.1 |
| 5,650,775 A | | 7/1997 | Van Steenbrugge .... 340/825.24 |
| 5,657,461 A | * | 8/1997 | Harkins et al. ............. 345/333 |
| 5,659,373 A | | 8/1997 | Hoekstra .................... 348/734 |
| 5,764,930 A | | 6/1998 | Staats ......................... 395/287 |
| 5,892,535 A | * | 4/1999 | Allen et al. ..................... 348/9 |
| 6,003,093 A | * | 12/1999 | Kester ........................ 709/301 |
| 6,052,750 A | * | 4/2000 | Lea ............................. 710/72 |

OTHER PUBLICATIONS

Wickelgren, Ingrid J., "The Facts About FireWire," IEEE Spectrum, vol. 34, No. 4, Apr. 1997, pp. 19–25, USA.

"A Bus on a Diet—The Serial Bus Alternative, An Introduction to the P1394 High Performance Serial Bus," Michael Teener, pp. 316–321, 1992, IEEE.

"The IEEE–1394 High Speed Serial Bus," R.H.J. Bloks, pp. 209–216. Philips Research Laboratories, vol. 50, No. 1/2, 1996.

* cited by examiner

METHOD AND APPARATUS FOR INCLUDING SELF-DESCRIBING INFORMATION WITHIN DEVICES

RELATED APPLICATIONS

This application claims priority under 35 U.S.C. §119(e) of the co-pending U.S. provisional application Serial No. 60/054,327 filed on Jul. 31, 1997 and entitled "A METHOD AND APPARATUS FOR INCLUDING SELF-DESCRIBING INFORMATION WITHIN DEVICES." The provisional application Serial No. 60/054,327 filed on Jul. 31, 1997 and entitled "A METHOD AND APPARATUS FOR INCLUDING SELF-DESCRIBING INFORMATION WITHIN DEVICES" is also hereby incorporated by reference.

FIELD OF THE INVENTION

The present invention relates to the field of including self-describing information within a device. More particularly, the present invention relates to the field of including information within a device describing the physical attributes, features, capabilities and operation of the device.

BACKGROUND OF THE INVENTION

The IEEE 1394-1995 standard, "1394-1995 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin compared to other bulkier cables used to connect such devices. A node on the IEEE 1394-1995 serial bus is considered a logical entity with a unique address on the bus structure. Each node provides an identification ROM, a standardized set of control registers and its own address space.

The IEEE 1394-1995 serial bus provides plug and play capabilities for applications. Devices can be added and removed from an IEEE 1394-1995 bus while the bus is active. If a device is so added or removed the bus will then automatically reconfigure itself for transmitting data between the existing nodes. To control any of these devices, the user must manually operate each device separately through controls on the device. In the alternative, it is well known that infrared control devices exist for a variety of home entertainment type products such as television, VCR, and sound systems. There are even a number of so-called 'universal remote' products available that can control a number of different brands or types of equipment.

If a computer system is connected as one of the nodes within the network, then particular devices connected to the network may be controlled through the computer system. The computer system runs driving software specific to the particular device which provides an interface to the user and allows the user to control and operate the device through the computer system. This driving software is typically packaged with the device and included on a floppy disk or CD-Rom. The driving software is then loaded into the computer system by the user as part of the initialization procedure when the device is first connected to the network or to the computer system directly. For example, when a printer is first connected to a computer system, a user must load the printer driver software on the computer system before the computer system is able to recognize and communicate with the printer. After the printer driver software is loaded on the computer system, the user has the ability to control the operation of the printer through commands entered into the computer system. If the printer driver software is later updated, the user must obtain the software upgrade, again on a floppy disk or CD-Rom, and load it into the computer system. For devices configured for operation with computer systems of different platforms, such as MAC or PC based platforms, multiple disks, each including the driving software and capable of being loaded into one of the available platforms, must be included with the device.

For many multimedia devices, such as camcorders and compact disk players, which may be connected to a computer system through an IEEE 1394-1995 network, such driver software is typically not available. While these devices may be able to communicate with the computer system, their control is effected through the device itself. Currently, a user is unable to control the operation of such a device through the computer system. However, as new applications for such devices are created, driving software may become critical to the successful operation of the device within a specific application.

Devices are also connected together or to a network without a computer system available within the configuration. In such a network or configuration, it is very likely that there is no device capable of running driving software for controlling the operation of other devices within the network. An example of such a network is a configuration including a television and a VCR, connected to each other. The user currently programs the VCR, in such a configuration, through text-based menus driven by the VCR and displayed on the television. To enter commands related to this programming operation, the user utilizes either the front panel of the VCR or a remote control device which sends transmissions to the VCR. There is currently no manner to control the operation of the VCR through the television. Current IEEE 1394-1995 technology also lacks a method to reliably determine characteristics of a device at a specific node, including the type of device, its features and capabilities and user interface information for representing the device and its features to the user.

What is needed is a method for storing information within a device, about that device, which can then be transmitted to other devices, either through a direct connection or through a network. What is further needed is a method for retrieving such self-describing information from a device or from information provided by the device. What is also needed is a method for automatically obtaining information and driving software from a device or from information provided by the device, thereby eliminating the necessity of including one or more disks containing the driving, software with the device.

SUMMARY OF THE INVENTION

Self-describing information is included within a device and contains information relating to a graphical representation of the device, the controls available on the device and the interface required to access those controls. The self-describing information is preferably embedded within a ROM within the device and is read by other devices coupled to the device for presenting a graphical user interface through which the device can be remotely controlled by a user. The self-describing information can also include an address from which additional information about the device and upgrades are automatically obtained. This address is either an internet address or points to a location within a network of devices. The address can also be modifiable. Alternatively, the self-describing information also includes driving software for enhancing the graphical user interface and controlling the operation of the device through another system. This driving software is written either in the native language of the device on which it is uploaded and executed or in a platform neutral language such as Java™. The graphical user interface is presented on a television, computer or other appropriate system for controlling multiple devices through the system. The controlling system obtains the self-describing information from each device within the configuration. The graphical user interface includes a graphical representation of the devices and specific control features available to the user presented in a graphical orientation. Alternatively, a three-dimensional representation of the device is presented with controls represented on the device. If no controlling system is available, a graphical user interface is controlled by an application within the device and presented on an available display.

DETAILED DESCRIPTION OF THE PREFERRED EMBODIMENT

Figure 1:
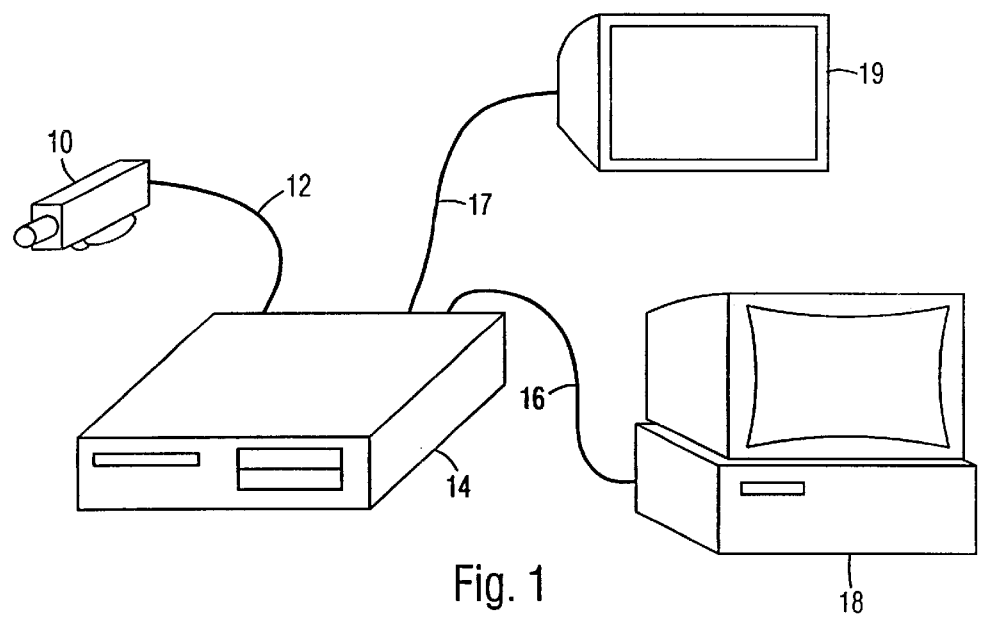
FIG. 1 illustrates a network configuration including a video camera, a video cassette recorder, a computer system and a television coupled together by the input/output (I/O) busses.

A device according to the present invention includes self-describing information embedded within the device which preferably contains information about the device, including information which can be used to generate a graphical representation of the device for use with a graphical user interface. The self-describing information also includes an internet address from which additional information about the device, its features, functions and controls is obtained. Alternatively, the self-describing information also includes driving software for enhancing the graphical user interface and controlling the operation of the device.

The graphical user interface is preferably presented on a television, if one is available within the network. Other display systems can be used such as a computer or other media device with an accompanying display. Through the graphical user interface, a user is able to control operation of the devices coupled within the network. The graphical user interface presents the user with information and status of the devices, as well as allowing the user to configure collections of devices for transmitting streams of data and completing tasks.

Preferably, the self-describing information is embedded in a read-only memory (ROM) within each device. Other devices coupled to a device, either directly or through a network, are then able to obtain the self-describing information from that device by a read operation of the device's ROM in order to provide an enhanced user interface through which the user can more easily and efficiently control the operation of the devices within the network. Alternatively, the self-describing information is stored within any other appropriate memory circuit or component within the device, such as tape memory, magnetic or optical disc memory and flash memory. In a further alternate embodiment, the self-describing information is stored on a media device such as a digital video disk, a video tape, a compact disc and a mini-disc or received through a receiver of a broadcast from a satellite.

In a situation where the device is coupled to another device with a microprocessor and a display, such as a computer system, television with a microprocessor or a settop box in combination with a television, the computer system obtains the self-describing information from the device and provides a graphical user interface on the display through which a user is able to control the device. This graphical user interface includes a graphical representation of the device and the specific control features available to the user. Through the graphical user interface the user is able to control the device through the computer system, allowing the user to control the operation of multiple devices through a single computer system. Throughout this document, the term computer system will be used to refer to any digital control device including a microprocessor and a display. While a television with an internal microprocessor and a settop box in combination with a television are two examples of such systems, it will be apparent that there are other general purpose or special purpose computer systems available.

The application software necessary to present the graphical user interface is preferably loaded onto and resident within the controlling device. In the preferred embodiment of the present invention, the self-describing information received from the device must be in a format understood by the application software in order to present the graphical user interface and send control instructions to the device. The application software provides a graphical user interface, as will be discussed below, which presents the graphical representation of the device and the controls available to the user. This graphical user interface is adaptable to many different types of devices. In an alternate embodiment, the application software is obtained by the computer system from the ROM within the device itself. The self-describing information also includes an internet address from which the computer system can automatically obtain additional or duplicate information about the device or even software for presenting an enhanced graphical user interface for controlling the device. In a further alternate embodiment, the self-describing information also includes an operating system driver for one of the most common operating systems, including Windows 95®, Macintosh® and Aperios™. The driving software is written either in the native language of the device on which it is uploaded and executed or in a platform neutral language such as Java™.

When a device is coupled in a configuration without a computer system, the self-describing information and other software available within the device will be used to present a graphical user interface to the user. This graphical user interface will be presented on whatever display is available to the device within the configuration. Through this graphical user interface, the user is then able to control the operation of the device. If no display is available within the configuration, the user will then be left to manually control the device without the aid of a graphical user interface.

An exemplary network configuration including a video camera 10, a video cassette recorder 14, a computer system 18 and a television 19 coupled together by the input/output (I/O) busses 12, 16 and 17, is illustrated in FIG. 1. The I/O bus 12 couples the video camera 10 to the video cassette recorder 14, allowing the video camera 10 to send data to the video cassette recorder 14 for recording. Through the I/O bus 12, the video cassette recorder 14 is also able to send communications to the video camera 10. The I/O bus 16 couples the video cassette recorder 14 to the computer system 18, allowing the video cassette recorder 14 to send data to the computer system 18 for display and allowing the computer system 18 to send communications to the video cassette recorder 14. Through the I/O busses 12 and 16, the computer system 18 is also able to send and receive communications from the video camera 10. The I/O bus 17 couples the video cassette recorder 14 to the television 19 allowing the video cassette recorder 14 to send data to the television 19 for display. Through the I/O busses 12 and 17, the television 19 is also able to send communications to and receive communications from the video camera 10. Preferably, the I/O busses 12, 16 and 17 are IEEE 1394-1995 serial busses. It should however be apparent to those skilled in the art that any other appropriate bus or network configuration may be used to couple the devices together.

Figure 2:
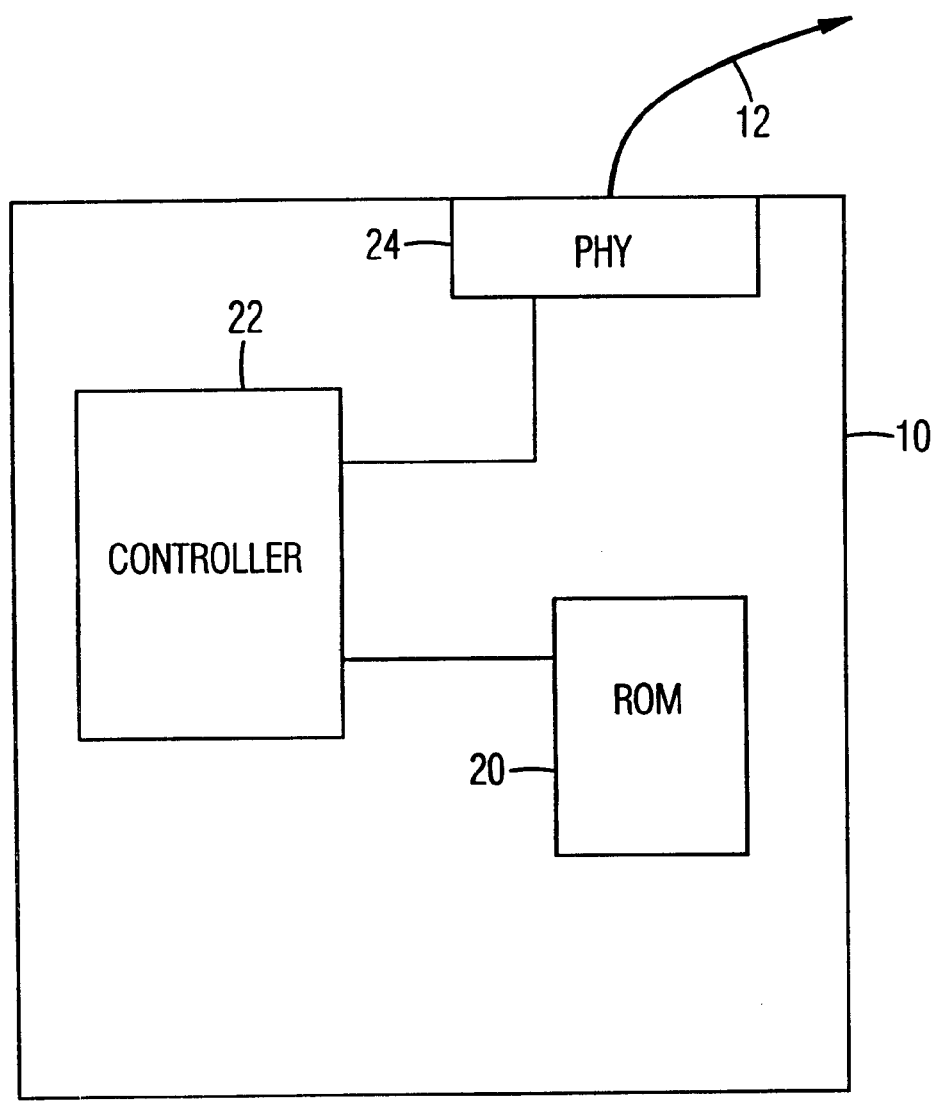
FIG. 2 illustrates a block diagram of relevant components within the video camera of FIG. 1.

A block diagram of relevant components within the video camera 10 is illustrated in FIG. 2. A bus interface circuit 24 for interfacing the device 10 to the I/O bus 12 and controlling the communications over the I/O bus 12 is coupled to a controller circuit 22. The controller circuit 22 controls the operation of the device 10 and the components included within the device. A ROM 20 for storing the self-describing information of the present invention and necessary instructional code is coupled to the controller 22. It should be apparent that the device 10 includes additional components not shown within FIG. 2. It also should be apparent that other devices including the self-describing information are similarly configured in this regard.

Figure 3:
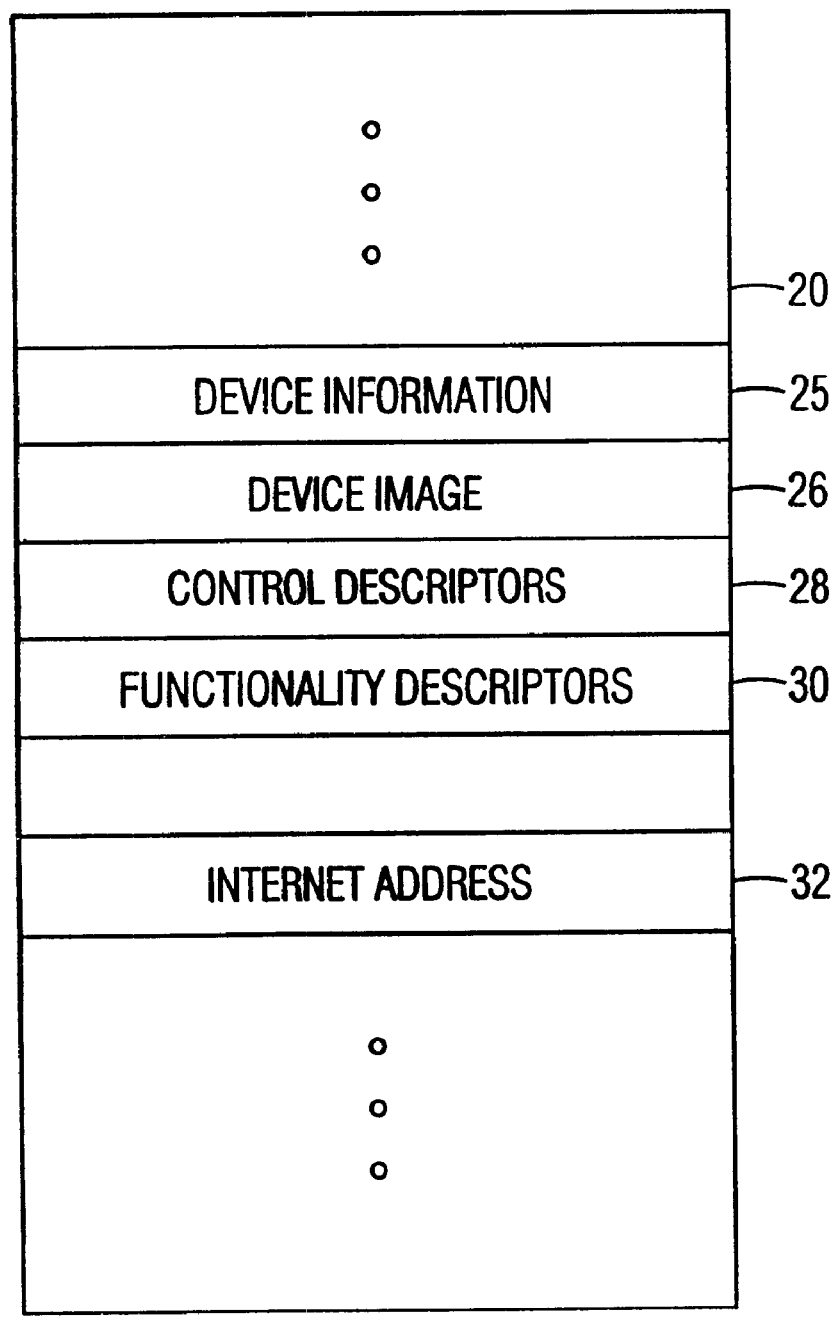
FIG. 3 illustrates a memory map of the read-only memory of the preferred embodiment of the present invention, including self-describing information.

The ROM 20 includes the self-describing information about the device 10. A memory map of the ROM 20, including self-describing information, within the preferred embodiment of the present invention, is illustrated in FIG. 3. The ROM 20 includes a section 25 containing information about the device, a section 26 containing information regarding the graphical representation of the device, a section 28 containing information regarding control descriptors and a section 30 containing information regarding functionality descriptors. The device image section 26 of the ROM 20 includes data for forming a graphical representation of the device. In order that this data can be read and understood by a variety of devices, the data is preferably stored in a standard format. In the preferred embodiment, the data representing the graphical representation of the device is stored in the portable network graphics (PNG) format. The device information section 25 includes information about the device including the manufacturer, the model number and the type of device.

The graphical representation of the device stored within the ROM 20 is preferably a 256 color representation, in order to fully represent the device and allow the graphical representation to be readily adapted to different types of environments. Alternatively, in order to conserve space within the ROM 20, less colors can be used to graphically represent the device 10. As known to those skilled in the art, the more colors used to represent the device 10, the greater the minimum bit-depth necessary for the image and the greater the storage space required within the ROM 20. Accordingly, available storage space within the ROM may be a consideration as to the detail of the graphical representation stored within the self-describing information. As is well known to those skilled in the art, it is also possible to encode and store graphics information in higher bit depths, such as 16, 24 or 32 bits. In an alternate embodiment, the graphical representation includes additional information such as transparency and color conversion information.

The control descriptor section 28 includes a description of each available physical button or control included on the device 10. Within the control descriptor section 28, there is preferably a description of each physical button or other control on the device 10, including localized text which provides a name for the control feature represented, the type of control and the location of the control on the device 10. The type of control information refers to whether the control is discrete or continuous and includes other descriptive information about the control, such as the range of allowable inputs. The location of the control is represented as a rectangle within the overall device image rectangle which describes the relative position of the control on the device 10. In this embodiment, this control information serves to describe the type of functionality represented by the physical features of the device 10. This information is then used by the computer system 18 or another device to generate a graphical user interface through which the user can control the operation of the device. As will be described in detail below, the graphical user interface of the preferred embodiment does not include the controls on the graphical representation of the device, but instead includes them in a block of available controls. Alternatively, the available controls are presented on the graphical representation of the device for selection by the user.

The functionality descriptor section 30 includes information which provides access to the control interface used by the device 10. The functionality descriptor information provides the information necessary for the: computer system 18 or another device to invoke the appropriate commands for controlling the operation of the device 10 with the available controls.

In an alternate embodiment of the present invention, the control and functionality descriptor sections are combined within the same section in the ROM 20. This allows each control and its associated functionality to be accessed together within the same physical space within the ROM 20.

Figure 4:
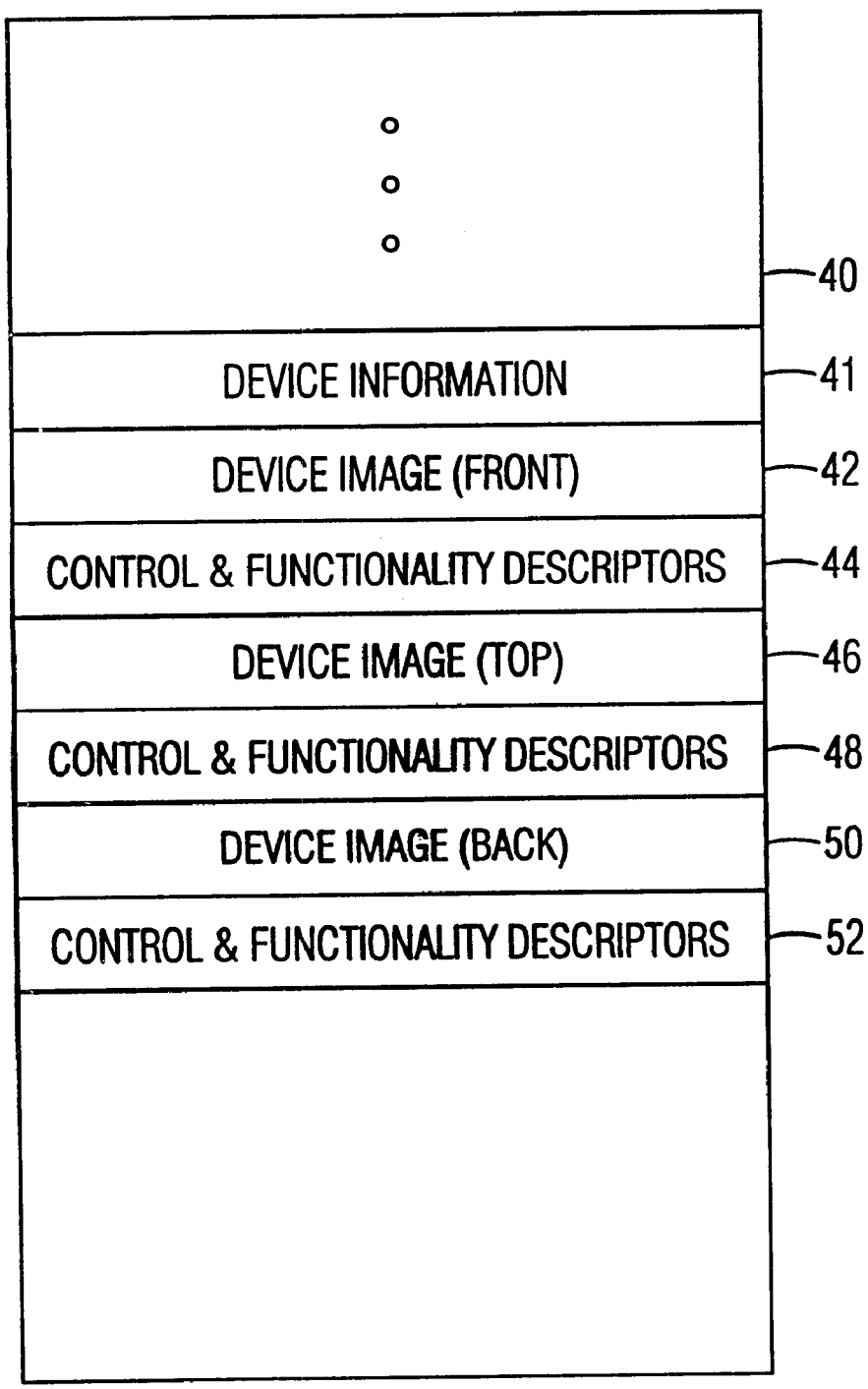
FIG. 4 illustrates a memory map of a read-only memory of an alternate embodiment of the present invention.

A memory map of a ROM 40 of an alternate embodiment of the present invention is illustrated in FIG. 4. The ROM 40 includes information for presenting a three-dimensional graphical representation of the device 10. The ROM 40 includes a device information section 41. The ROM 40 includes a section 42 containing information regarding the graphical representation from the front of the device and a section 44 containing control and functionality descriptors relating to controls present when the device is viewed from the front. The ROM 40 also includes a section 46 containing information regarding the graphical representation from the top of the device and a section 48 containing control and functionality descriptors relating to controls present when the device is viewed from the top. The ROM 40 further includes a section 50 containing information regarding the graphical representation from the back of the device and a section 52 containing control and functionality descriptors relating to controls present when the device is viewed from the back. Again, this information is then used by the computer system 18 or another device to generate a three-dimensional graphical user interface through which the user can control the operation of the device. As should be apparent, device images from other sides of the device may be included as appropriate, depending on the device and the placement of the available controls.

Presenting a three-dimensional graphical representation of the device 10 in this manner provides a user with a graphical representation of the controls which are otherwise available to the user manually. In this manner, devices with controls on or, behind fold-down panels can be graphically represented to correspond to the actual appearance of the device and allow the user to control the operation of the device graphically through another device or system as they would otherwise control the device manually.

The specific graphical user interface presented to the user depends on the types of other devices available to the device 10, through the network. For example, if the video camera 10 is coupled to a network including the computer system 18, as illustrated in FIG. 1, then a more elaborate graphical user interface for controlling the video camera 10 should be presented to the user by the computer system 18. If the video camera 10 however is coupled to a network which includes only the television 19, but not the computer system 18, then a less elaborate graphical user interface will be appropriate because this graphical user interface will be driven by the video camera itself and not the television 19, unless the television 19 includes an internal microprocessor or is coupled to a settop box.

In order to allow the devices including self-describing information of the present invention to be readily adaptable to many different configurations, the ROM 20 of the preferred embodiment also includes a section 32 containing an internet address. This internet address is used by the computer system to obtain information about the device 10, as necessary for presenting a more elaborate graphical user interface to the user. As should be apparent, the computer system 18 must include a modem in order to access the information at the internet address. Using the internet address, the computer system 18 automatically obtains more detailed or additional information about the device 10. Such access of the internet address is preferably transparent to the user and is performed after initialization of the device 10 to the network. Through this internet address, the computer system 18 is able to obtain driving software for controlling the operation of the device 10, thereby eliminating the need to include a disk with the device. Also through this internet address, the computer system 18 can later automatically obtain upgrades to the self-describing information or driving software, allowing devices to be later used in applications not available when the device was first designed. In an alternate embodiment of the present invention, only the internet address is included within the device and the self-describing information is automatically obtained by a controlling device after reading the internet address from a target device. This embodiment minimizes the required storage space required within the device. Depending upon the amount of memory available, it is also possible to include user instructions or 'help' information in the ROM 20.

The memory map of the ROM 20 illustrated in FIG. 3 is preferred because it provides high capability for presenting a graphical user interface while minimizing overhead and the data is always readily available to a controlling device. The ROM 20 within the device 10 includes a limited amount of memory space which is also utilized for other operational code and data required by the controller 22. In order to minimize the amount of the ROM 20 required for storing the self-describing information of the present invention, the ROM 20 includes the information within the sections 25, 26, 28 and 30, as described above, for presenting a graphical user interface to the user. The internet address in the section 32 is provided for those configurations for which more information is appropriate. Such systems will typically have memory space available, on which the information received from the internet address is loaded. Therefore, through the internet address, a controlling device, such as the television 19, is able to obtain the additional information for providing enhanced functionality for controlling a target device 10, such as the video camera 10. In an alternate embodiment, the ROM includes only the internet address and a controlling device must rely on the internet to obtain the self-describing information for the target device. In a further alternate embodiment, the ROM includes a uniform resource locator (URL) address: from which the self-describing information for the target device is obtained. This URL address can point to an internet address, to a location in the local audio/video network or to a location within the target device itself. This URL address can point to a memory storage location such as a hard disk drive, either in the local audio/video network or within the target device, which contains the self-describing information. In still a further alternate embodiment, this URL address is modifiable, allowing a user to download self-describing information, as discussed herein, and store that information on a hard disk drive, for example. The URL for the target device can then be modified to point to this hard disk file to obtain the self-describing information for the device.

Figure 5:
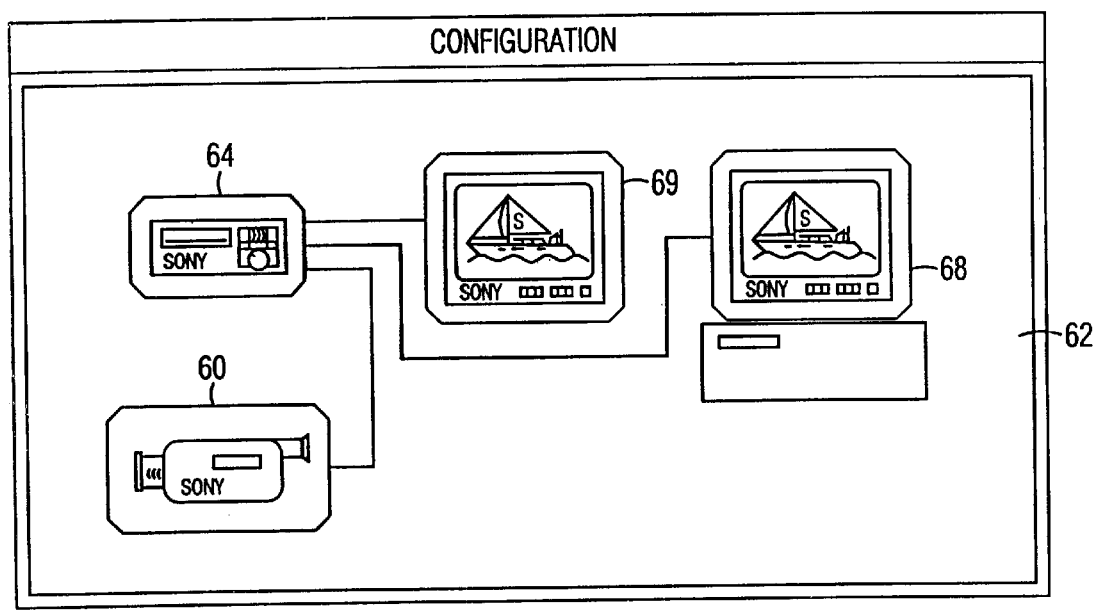
FIG. 5 illustrates an exemplary configuration window of the graphical user interface of the present invention.

An exemplary configuration window which is constructed using the preferred embodiment of the present invention is illustrated in FIG. 5. This configuration window 62 is displayed on the computer system 18 and provides to a user a graphical representation representing the devices within al configuration. It should be apparent that this graphical user interface can be displayed on any other appropriate device within the network, through which the user is able to control the other devices. In the configuration window 62, the devices and connections of the configuration illustrated in FIG. 1 are represented. Specifically, a graphical representation 60 of the video camera 10 is shown coupled to a graphical representation 64 of the video cassette recorder 14. The graphical representation 64 of the video cassette recorder 14 is shown coupled to a graphical representation 68 of the computer system 18 and a graphical representation 69 of the television 19.

The configuration window 62 provides a collection of icons representing the devices available within the network and a representation of the actual topology of the device connections. The icons are the graphical representations obtained by the computer system 18 from the ROM 20 within each device. Preferably, the location of the devices within the window is determined by the computer system 18 in order to minimize crossed lines. The device connections are preferably determined utilizing a media manager as taught in U.S. patent application Ser. No. 09/075,047, filed on May 8, 1998, and entitled "Media Manager For Controlling Autonomous Media Devices Within A Network Environment And Managing The Flow And Format Of Data Between The Devices," which is hereby incorporated by reference. Alternatively, the device connections are determined by directly examining the IEEE 1394-1995 serial bus.

Within the configuration window 62, a user is able to obtain detailed information about the device by selecting the graphical representation or icon of the device. This detailed information includes information obtained from the self-describing information stored within the device's ROM 20, including device specific data. The detailed information also includes the current status of the device.

Figure 6:
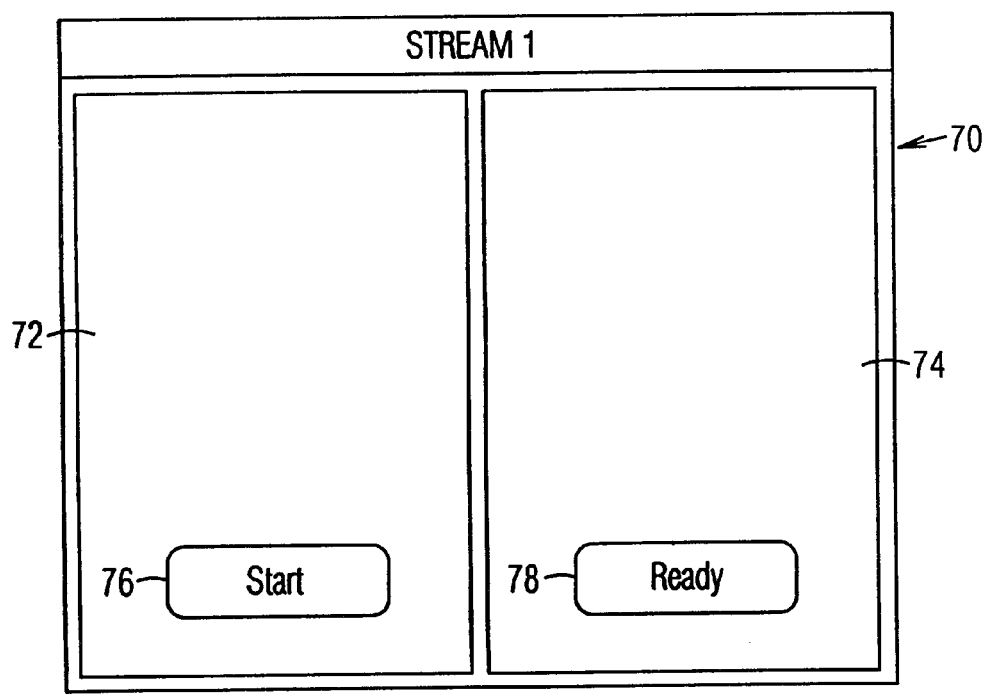
FIG. 6 illustrates a stream window including two subpanes presented within the graphical user interface of the present invention.

Within the graphical user interface, a stream window, as illustrated in FIG. 6, is used to provide available controls and facilitate the completion of an application or task. The stream window 70 includes two subpanes 72 and 74. The first subpane 72 includes a "Start" control button 76. The second subpane 74 includes a "Ready" control button 78. When operation of devices within the network is desired, a source device, from which data is to be transmitted, is placed within the first subpane 72, by selecting the device in the configuration window 60 and dragging it to the first subpane 72. One or more sink devices, to which the data from the source device is to be sent, are then placed within the second subpane 74 in the same manner. As will be described below, when more than one sink device is included within a stream window, each sink device will preferably be included in a separate sub-pane.

Figure 7:
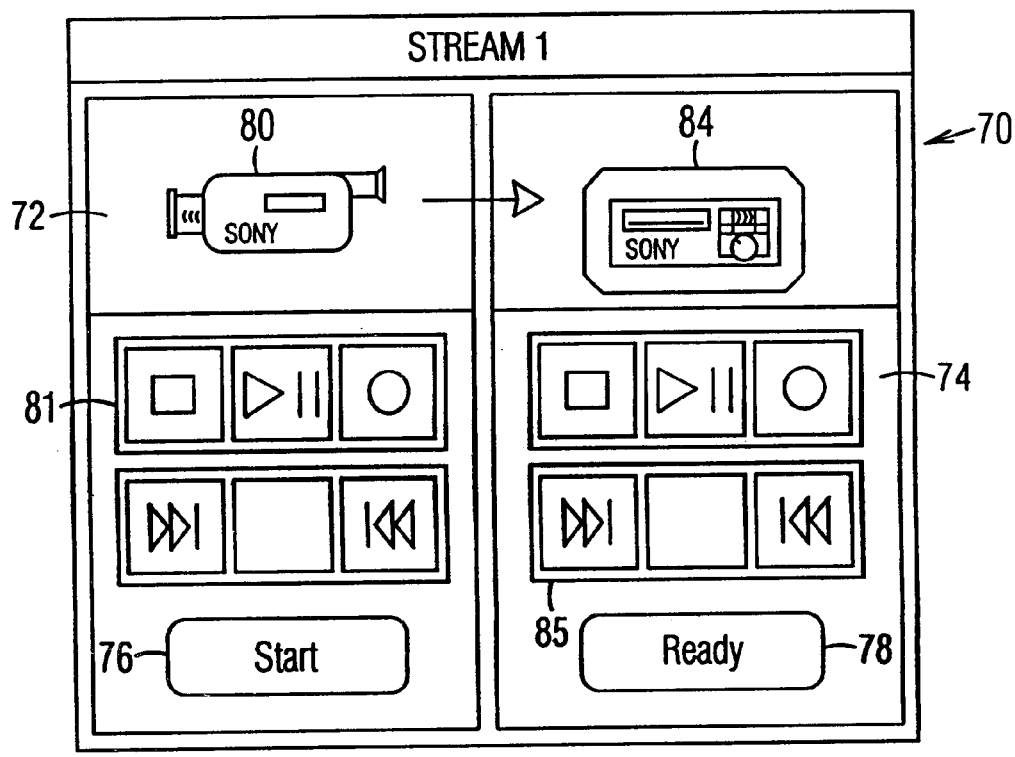
FIG. 7 illustrates an example of a stream window with a video camera as a source device and a video cassette recorder as a sink device.

An example of a stream window with a video camera as a source device and a video cassette recorder as a sink device is illustrated in FIG. 7. Within the first subpane 72, the graphical representation 80 of the video camera is displayed after being selected and moved from the configuration window 60. Once the graphical representation 80 is moved into the first subpane 72, the available control functions 81, obtained from the self-describing data within the ROM 20 of the video camera 10, are also displayed within the first subpane 72. Within the second subpane 74, the graphical representation 84 of the video cassette recorder is displayed after being selected and moved from the configuration window 60. Once the graphical representation 84 is moved into the second subpane 74, the available control functions 85, obtained from the self-describing data within the ROM of the video cassette recorder 14, are displayed within the second subpane 74.

From the stream window 70, displayed on the computer system 18, a user is able to control the operation of the video camera 10 and the video cassette recorder 14 for the application of sending a stream of video and audio data from the video camera 10 to the video cassette recorder 14. The controlling device sends the necessary commands in order to activate the target device(s) and complete the appropriate task(s). When the user is then ready to send the stream of data, the appropriate controls 81 are activated within the source subpane, in this case the play button, and then the "Start" control button 76 is activated. When the "Start" control button 76 is activated, the computer system 18 instructs the video camera 10 to begin sending the stream of data to the video cassette recorder 14. If necessary, commands are sent from the controlling device to the video camera 10 in order to turn the power to the video camera 10 on and put the video camera 10 into a play mode. The video cassette recorder 14 will record the stream of data from the video camera 10 once the appropriate controls 85 are activated within the sink subpane, in this case the record button, and the "Ready" control button 78 is activated. When the "Ready" control button 78 is activated, the computer system 18 instructs the video cassette recorder 14 to begin recording the stream of data from the video camera 10. If necessary, commands are sent from the controlling device to the video cassette recorder 14 in order to turn the power to the video cassette recorder 14 on and put the video cassette recorder 14 into a record mode. Until the controls are then deactivated, the video cassette recorder 14 will record the stream of data sent from the video camera 10. In order to complete this task, the computer system 18 initializes an appropriate channel on the IEEE 1394-1995 serial bus and controls the flow of the data over the IEEE 1394-1995 serial bus.

Figure 8:
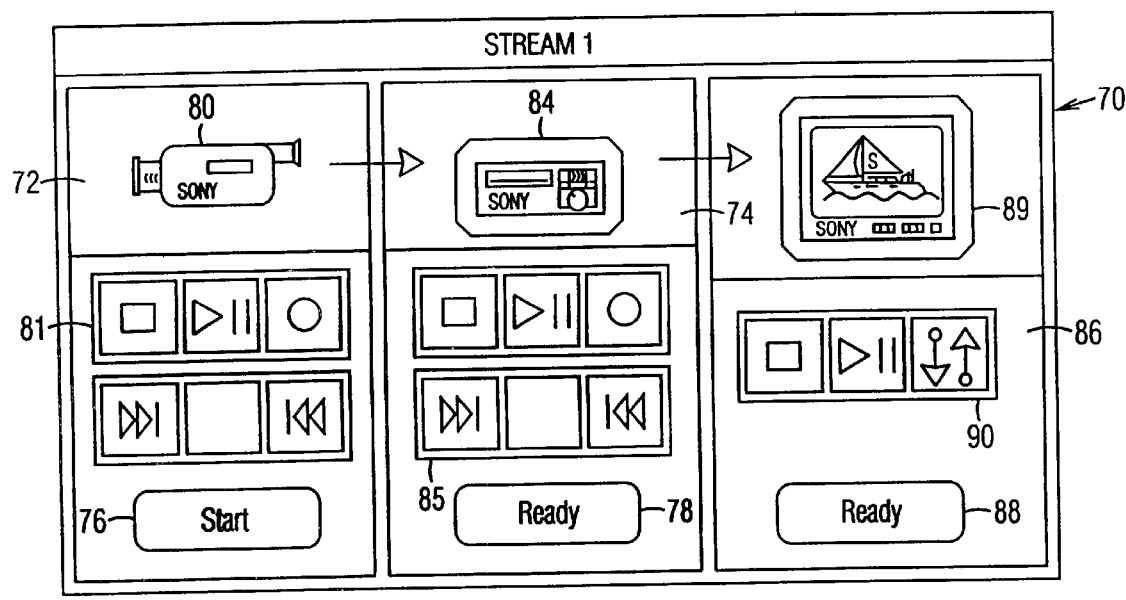
FIG. 8 illustrates an example of a stream window having a source device and multiple sink devices.

Additional sink devices are added to the stream window 70 by selecting the appropriate graphical representation of the desired device and moving it to the stream window 70. When graphical representations of additional devices are moved into the stream window 70, those devices automatically become sink devices to receive the data stream from the source device. An example of a stream window having a source device and multiple sink devices is illustrated in FIG. 8. The stream window 70 of FIG. 8 includes the first and second subpanes 72 and 74 of the stream window of FIG. 7, as discussed above. In addition, the stream window of FIG. 8 includes a third subpane 86. Within the third subpane 86, the graphical representation 89, representing the television 19, is displayed after being selected and moved from the configuration window 60. Once the graphical representation 89 is moved into the third subpane 86, the available control functions 90 of the television, which are obtained by the computer system 18 from the self-describing data within the ROM in the television 19, are displayed within the third subpane 86. The third subpane 86 also includes a "Ready" control button 88. In this stream, the television 19 will display the stream of data being transmitted from the video camera 10, once the appropriate controls are activated within the sink subpane, in this case the play button, and the "Ready" control button 88 is activated. When the "Ready" control button 88 is activated, the computer system 18 instructs the television 19 to begin displaying the stream of data from the video camera 10. If necessary, the controlling device will also send commands to ensure that the power to the television 19 is turned on and that the television 19 is on the appropriate channel to display the video stream sent from the video camera 10. Until the controls are then deactivated, the video cassette recorder 14 will record and the television 19 will display the stream of data from the video camera 10.

Figure 9:
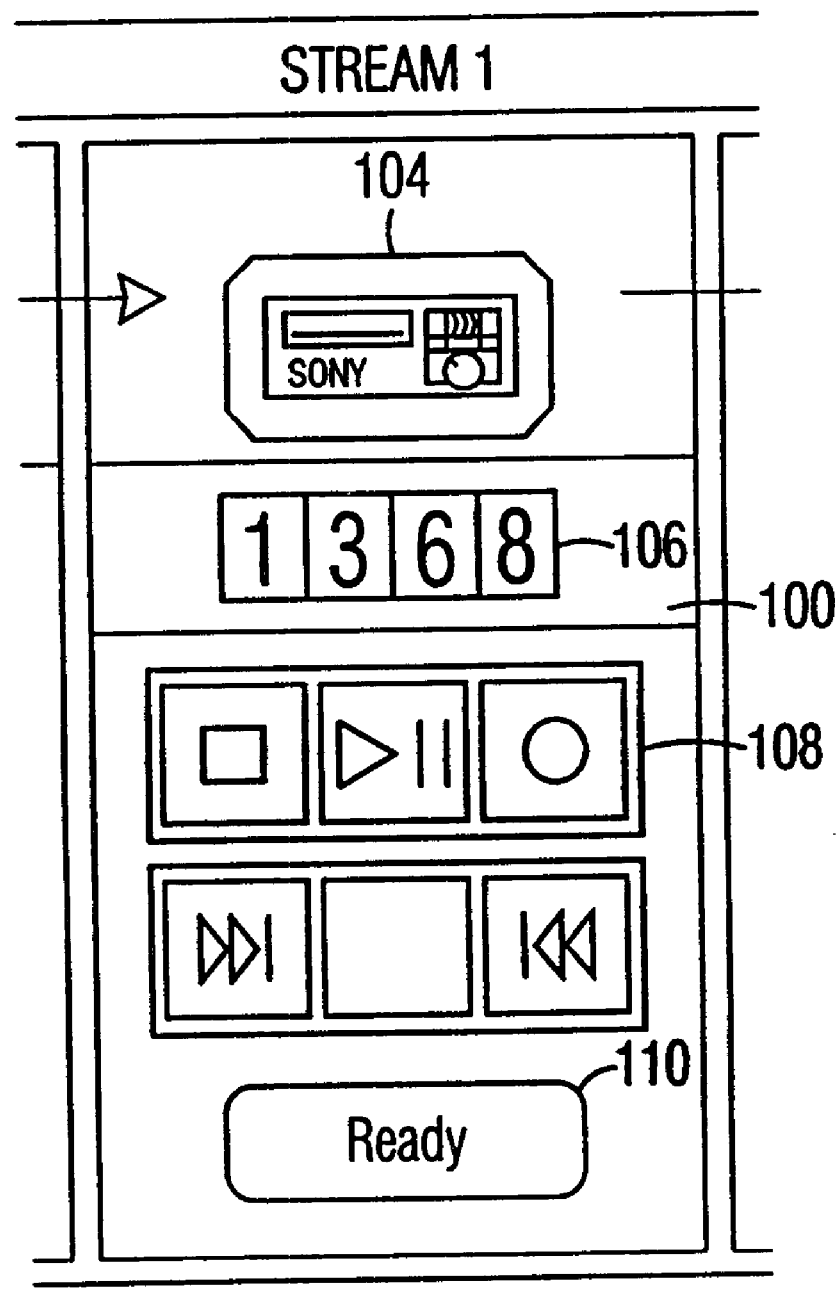
FIG. 9 illustrates an alternate subpane to be displayed within the stream window.

An alternate subpane to be displayed within the stream window is illustrated in FIG. 9. The subpane 100 includes the graphical representation of a video cassette recorder 104, the available controls 108 and the "Ready" control button 110. In addition, the subpane 100 also includes a status area 106 for displaying to the user a status of the video cassette recorder. In this example, the status area 106 displays a counter representing a count from a particular point on the video tape within the video cassette recorder. The status area 106 is initialized from the self-describing data stored within the ROM of the video cassette recorder 14. The status area is then updated by communications between the video cassette recorder 14 and the computer system 18. In the example illustrated in FIG. 9, the counter is updated by signals sent from the video cassette recorder 14 to the computer system 18 during the flow of the stream of data from the video camera 10 to the video cassette recorder 14.

In an alternate embodiment of the graphical user interface of the present invention, used in conjunction with the ROM 40 illustrated in FIG. 4, the graphical representations of the devices within the configuration are three-dimensional. Also, the available controls are displayed directly on the graphical representation of the device, rather than below the graphical representation of the device. In a further alternate embodiment of the present invention, the self-describing information is used to provide a graphical user interface as taught in U.S. patent application Ser. No. 08/747,452, entitled "Graphical User Interface Including Graphical Representation Of Devices Coupled To IEEE 1394-1995 Serial Bus And Flow Of Data Between Applications" and filed on Nov. 12, 1996, which is hereby incorporated by reference.

Figure 10:
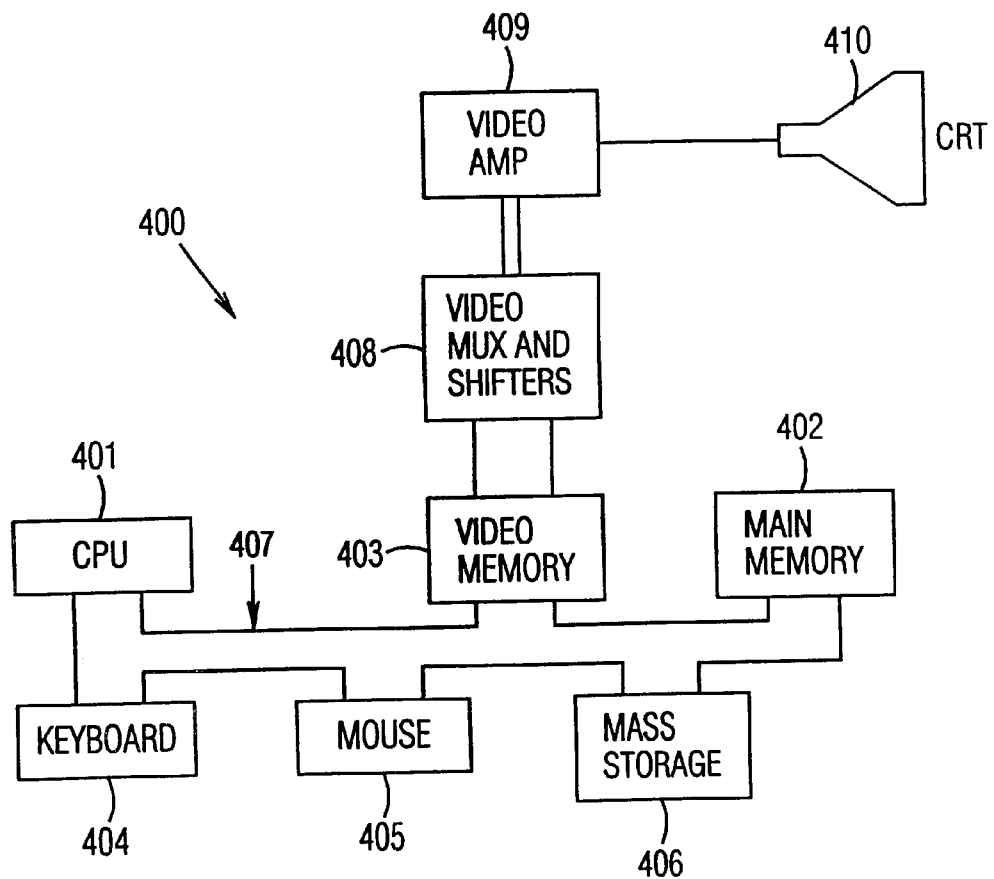
FIG. 10 illustrates an exemplary computer system on which the graphical user interface of the present invention is implemented.

While the graphical user interface of the present invention may advantageously be implemented on nearly any conventional computer system or other system under processor control, an exemplary computer system 400 on which the graphical user interface of the present invention is implemented; is illustrated in FIG. 10. In FIG. 10, the computer system 400 includes a central processor unit (CPU) 401, a main memory 402, a video memory 403, a keyboard 404 for user input, supplemented by a conventional mouse 405 for manipulating graphic images as a cursor control device and a mass storage device 406, all coupled together by a conventional bidirectional system bus 407. The mass storage device 406 may include both fixed and removable media using any one or more of magnetic, optical or magneto-optical storage technology or any other available mass storage technology. The system bus 407 contains an address bus for addressing any portion of the memory 402 and 403. The system bus 407 also includes a data bus for transferring data between and among the CPU 401, the main memory 402, the video memory 403 and the mass storage device 406.

A video multiplex and shifter circuit 408 is coupled to a port of the video memory 403 and to a video amplifier 409. The video amplifier 409 drives a monitor or display 410 on which the graphical user interface of the present invention is displayed. The video multiplex and shifter circuitry 408 and the video amplifier 409 convert pixel data stored in the video memory 403 to raster signals suitable for use by the monitor 410.

The self-describing information included within a device and the graphical user interface of the present invention allow a user to control the operation of devices preferably coupled together by an IEEE 1394-1995 serial bus network. The graphical user interface incorporates the self-describing information from devices within the network, presenting to the user a graphical representation of the devices and their available controls. It should be apparent that the graphical user interface of the present invention can also be used to control devices coupled together in other, types of networks and configurations. It should be apparent that many other types of graphical user interfaces could be generated using the self-describing information. It should also be apparent that the self-describing information can be used for other types of applications and in other environments than those described and illustrated. The self-describing information of the present invention is preferably used to provide a graphically oriented interface through which a user has the ability to control one or more devices through a single device or system. This graphically oriented interface includes graphical representations of the devices and available controls. An internet address is also provided within the self-describing information to allow the system through which the interface is provided to obtain additional information about the device or software for driving the device.

The present invention has been described in terms of specific embodiments incorporating details to facilitate the understanding of principles of construction and operation of the invention. Such references herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of interfacing between devices comprising:
   a. embedding self-describing information within a first device, wherein the self-describing information includes information related to operation and control of the first device including one or more of a graphical representation of the first device, information regarding controls and functionality of the first device, a first interface required to access the controls and an address from where additional information about the first device is obtained; and
   b configuring the first device to allow a second device to access the self-describing information for interfacing with the first device.

2. The method as claimed in claim 1 further comprising providing a second interface on the second device using the self-describing information, wherein a user has the ability to control operation of the first device through the second interface.

3. The method as claimed in claim 2 wherein the second interface includes the graphical representation of the device and available controls.

4. The method as claimed in claim 3 wherein the self-describing information includes an operating system driver.

5. The method as claimed in claim 3 wherein the self-describing information includes a user application.

6. The method as claimed in claim 5 wherein the user application provides a graphical user interface through which a user is provided access to the user application.

7. The method as claimed in claim 3 wherein the address is an internet address.

8. The method as claimed in claim 3 wherein the address points to a location within a network of devices which includes the first device and the second device.

9. The method as claimed in claim 3 wherein the address is modifiable.

10. A device including self-describing information comprising:
   a. means for storing self-describing information about the device, wherein the self-describing information includes information related to operation and control of the device including one or more of a graphical representation of the device, information regarding controls and functionality of the device, a control interface required to access the controls and an address from where additional information about the device is obtained;
   b. a physical interface for allowing the device to communicate with other devices including transmitting the self-describing information; and
   c. a controller coupled to the means for storing and to the physical interface for controlling communication through the physical interface with other devices.

11. The device as claimed in claim 10 wherein the address is an internet address.

12. The device as claimed in claim 10 wherein the self-describing information is used to provide a graphical interface on a controlling device for controlling operation of the device through the controlling device.

13. The device as claimed in claim 10 wherein the means for storing self-describing information includes a memory device.

14. The device as claimed in claim 13 wherein the memory device is a read-only memory.

15. The device as claimed in claim 10 wherein the means for storing self-describing information includes a media device.

16. The device as claimed in claim 10 wherein the means for storing self-describing information includes a broadcast receiving device.

17. The device as claimed in claim 10 wherein the physical interface is an IEEE 1394 interface for interfacing the device to an IEEE 1394 serial bus structure.

18. A system configuration comprising:
   a. a plurality of devices coupled together, each of the plurality including:
      i. means for storing self-describing information about a respective one of the plurality of devices, wherein the self-describing information includes information related to operation and control of the device including one or more of a graphical representation of the device, information regarding controls and functionality of the device, a control interface required to access the controls and an address from where additional information about the device is obtained;
      ii. a physical interface for allowing the device to communicate with other devices including transmitting the self-describing information; and
   b. a system coupled to the plurality of devices for presenting a graphical interface, utilizing the self-describing information from each of the plurality of devices, through which operation of the plurality of devices is controlled, the system including a microprocessor and a display.

19. The system configuration as claimed in claim 18 wherein the means for storing includes a memory device.

20. The system configuration as claimed in claim 19 wherein the memory device is a read-only memory.

21. The system configuration as claimed in claim 18 wherein the self-describing information includes an operating system driver.

22. The system configuration as claimed in claim 21 wherein the self-describing information includes a user application.

23. The system configuration as claimed in claim 22 wherein the address is an internet address.

24. The system configuration as claimed in claim 22 wherein the address points to a location within one of the plurality of devices.

25. The system configuration as claimed in claim 18 wherein the graphical interface includes graphical representations of the plurality of devices and connections between devices.

26. The system configuration as claimed in claim 25 wherein operation of selected devices is controlled through the interface by communications from the system to the selected devices.

27. The system configuration as claimed in claim 26 wherein the system and the plurality of devices are all coupled together by an IEEE 1394 bus structure.

28. A graphical user interface for controlling operation of devices coupled together into a network configuration, the graphical user interface comprising:
   a. a plurality of device images each representing a device within the network configuration;
   b. graphical representations of connections between the plurality of device images representing actual connections of the devices within the network configuration; and
   c. control means for displaying available controls for selected ones of the devices and controlling operation of the devices based on selected controls;
   wherein the plurality of device images and the available controls are obtained from self-describing information about a corresponding device stored within the devices.

29. The graphical user interface as claimed in claim 28 wherein the graphical user interface is displayed on a computer system having a display, a memory and an input device.

30. The graphical user interface as claimed in claim 29 wherein the input device is a mouse.

31. The graphical user interface as claimed in claim 28 wherein the graphical user interface is displayed on a television.

32. The graphical user interface as claimed in claim 31 wherein the input device is an infrared remote control device.

33. The graphical user interface as claimed in claim 28 wherein the self-describing information includes an address through which the device image and the available controls are obtained.

34. The graphical user interface as claimed in claim 33 wherein the address is an internet address.

35. The graphical user interface as claimed in claim 33 wherein the address points to a location within the network configuration.

36. The graphical user interface as claimed in claim 28 wherein the self-describing information for a device includes a graphical representation of the device and information regarding controls and functionality of the device.

37. A system for controlling devices coupled to a bus structure comprising:
   a. a bus structure configured for providing communications between devices;
   b. a plurality of devices coupled to the bus structure for communicating across the bus structure, each of the plurality of devices including self-describing information about a corresponding one of the plurality of devices, wherein the self-describing information includes information related to operation and control of the corresponding device including one or more of a graphical representation of the device, information regarding controls and functionality of the device, a control interface required to access the controls and an address from where additional information about the device is obtained; and c. a graphical user interface for controlling operation of the plurality of devices including:
   i. a plurality of device images each representing a corresponding one of the plurality of devices and each obtained from the self-describing information of the corresponding device; and
   ii. a bus structure representation illustratively coupled to each of the plurality of device images representing the bus structure;

wherein operation of the devices is controlled through the graphical user interface.

38. The system as claimed in claim 37 wherein the graphical user interface is displayed on one of the devices including a microprocessor and a display.

39. The system as claimed in claim 38 wherein the graphical user interface further comprises control means for displaying available controls for selected ones of the devices and controlling operation of the devices based on selected controls, wherein the available controls are obtained from the self-describing information of the corresponding device.

40. The system as claimed in claim 39 wherein the bus structure is an IEEE 1394 serial bus structure.

41. The system as claimed in claim 37 wherein the address includes an internet address through which additional information about the device is obtained.

42. The system as claimed in claim 41 wherein each of the plurality of devices includes a memory for storing the self-describing information.

43. The system as claimed in claim 42 wherein the memory is a read-only memory.

44. The system as claimed in claim 37 wherein the address point to a location within the devices coupled to the bus structure through which additional information about the device is obtained.

45. A method of interfacing between devices comprising:
   embedding self-describing informations within a first device, wherein the self-describing information includes information related to operation and control of the first device including one or more of a graphical representation of the first device, information regarding controls and functionality of the first device, a first interface required to access the controls and an address from where additional information about the first device is obtained; wherein the information related to operation and control of the first device includes one or more of a graphical representation of the first device, information regarding controls and functionality of the first device, and a first interface required to access the controls and configuring the first device to allow a second device to access the self-describing information for interfacing with the first device.

46. The method as claimed in claim 45 wherein the self-describing information includes a graphical representation of the first device.

47. The method as claimed in claim 45 wherein the self-describing information further includes information regarding controls and functionality of the first device.

48. The method as claimed in claim 45 wherein the address is an internet address.

49. The method as claimed in claim 45 wherein the address points to a location within a network of devices which includes the first device and the second device.

50. The method as claimed in claim 49 wherein the network is a wide-area network.

51. The method as claimed in claim 45 wherein the address is modifiable.

52. The method as claimed in claim 45 wherein the self-describing information is modifiable.

53. The method as claimed in claim 45 further comprising providing an interface on the second device using the information, wherein a user has ability to control operation of the first device through the interface.

54. The method as claimed in claim 53 wherein the interface includes a graphical representation of the first device and available controls.

55. The method as claimed in claim 54 wherein the graphical representation is interactive allowing the user to control operation of the first device.

56. A device including self-describing information comprising:
   a. a memory circuit configured to store self-describing information about the device, wherein the self-describing information includes one or more of a graphical representation of the device, information regarding controls and functionality of the device, a control interface required to access the controls and an address from where information related to operation and control of the device is obtained;
   b. a physical interface configured to allow the device to communicate with other devices including transmitting the self-describing information; and
   c. a controller coupled to the memory circuit and to the physical interface to control communication through the physical interface with other devices.

57. The device as claimed in claim 56 wherein the address is an internet address.

58. The device as claimed in claim 56 wherein the address points to a location within a network of devices which includes the device and the controller.

59. The device as claimed in claim 58 wherein the network is a wide-area network.

60. The device as claimed in claim 56 wherein the address is modifiable.

61. The device as claimed in claim 56 wherein the self-describing information is modifiable.

62. The device as claimed in claim 56 wherein the information is used to provide a graphical interface on a controlling device to control operation of the device through the controlling device.

63. The device as claimed in claim 62 wherein the interface includes a graphical representation of the device and available controls.

64. The device as claimed in claim 63 wherein the graphical representation is interactive allowing the user to control operation of the first device.

* * * * *

UNITED STATES PATENT AND TRADEMARK OFFICE
CERTIFICATE OF CORRECTION

PATENT NO.   : 6,421,069 B1
DATED        : June 4, 1998
INVENTOR(S)  : Harold Aaron Ludtke et al.

It is certified that error appears in the above-identified patent and that said Letters Patent is hereby corrected as shown below:

Column 15,
Line 42, delete "informations" and insert -- information --.

Signed and Sealed this

Thirty-first Day of August, 2004

JON W. DUDAS
*Director of the United States Patent and Trademark Office*